United States Patent
Roberts, Jr. et al.

(10) Patent No.: US 8,938,948 B2
(45) Date of Patent: Jan. 27, 2015

(54) DIESEL ENGINE EXHAUST AFTERTREATMENT SYSTEM AND METHOD OF OPERATION

(71) Applicants: Charles E. Roberts, Jr., Helotes, TX (US); Christopher J. Chadwell, San Antonio, TX (US)

(72) Inventors: Charles E. Roberts, Jr., Helotes, TX (US); Christopher J. Chadwell, San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 240 days.

(21) Appl. No.: 13/655,372

(22) Filed: Oct. 18, 2012

(65) Prior Publication Data
US 2014/0109553 A1 Apr. 24, 2014

(51) Int. Cl.
*F01N 3/20* (2006.01)

(52) U.S. Cl.
USPC .......................................... 60/288

(58) Field of Classification Search
CPC .................................. F01N 3/18; Y02T 10/22
USPC ...................................................... 60/287, 288
See application file for complete search history.

(56) References Cited

U.S. PATENT DOCUMENTS

| 2010/0126148 A1* | 5/2010 | Morishima et al. | 60/287 |
| 2012/0017587 A1* | 1/2012 | Yoshida et al. | 60/602 |

FOREIGN PATENT DOCUMENTS

WO    WO 2010116541 A1 * 10/2010

* cited by examiner

*Primary Examiner* — Kenneth Bomberg
*Assistant Examiner* — Jonathan Matthias
(74) *Attorney, Agent, or Firm* — Chowhury & Georgakis PC; Ann C. Livingston

(57) ABSTRACT

A diesel engine exhaust aftertreatment system and method of use. The system and method combine the attributes of lean or stoichiometric operation, using multiple LNTs (lean NOx traps) with one being capable of acting both as a lean NOx trap and a three-way catalyst. The engine is operated with lean air-to-fuel ratios during times that LNT treatment can efficiently reduce NOx from the exhaust gas. During times that lean NOx treatment is ineffective, the diesel engine is operated at or near a stoichiometric air-fuel ratio, so that three-way catalyst treatment can be used.

10 Claims, 2 Drawing Sheets

DIESEL ENGINE EXHAUST AFTERTREATMENT SYSTEM AND METHOD OF OPERATION

TECHNICAL FIELD OF THE INVENTION

This invention relates to reducing exhaust emissions from diesel-fueled internal combustion engines, and more particularly to a diesel engine exhaust aftertreatment system designed for extremely low emissions.

BACKGROUND OF THE INVENTION

Internal combustion engines are subject to strict exhaust emissions limits. Approaches to reducing emissions include new combustion designs and fuel modifications, but these improvements have fallen short of meeting the emissions limits. Other approaches involve the use of exhaust aftertreatment devices, which have achieved significant emissions reductions.

For diesel engines, which are conventionally run at a lean air-fuel ratio, the main pollutants of concern are oxides of nitrogen (NOx) and particulate matter (PM). The NOx levels result from the lean air-fuel ratio and the relatively high levels of oxygen in the exhaust. The PM is composed of black smoke (soot), sulfates generated by sulfur in fuel, and components of unburned fuel and oil.

Modern diesel engines must meet strict NOx emissions limits while also providing high energy conversion efficiency. To these ends, current diesel engines use SCR (selective catalytic reduction) or LNT (lean NOx trap) catalysts. When the engine is operated at a lean air-fuel ratio, these catalysts are fairly effective at NOx reduction without loss of engine efficiency.

A three-way catalyst (TWC) of the type used for gasoline engines is effective at NOx reduction, but does not function well with higher levels of oxygen in the exhaust. If the diesel engine is run at a stoichiometric air-fuel ratio to allow use of a TWC, engine efficiency is degraded.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a diesel engine exhaust aftertreatment system and method of use. The system and method combine the attributes of both lean and stoichiometric operation, using multiple LNTs (lean NOx traps) with one being capable of acting both as a lean NOx trap and a three-way catalyst.

The system and method achieve diesel engine efficiency while simultaneously achieving low pollutant emissions levels. The diesel engine is operated with lean air-to-fuel ratios during times that the aftertreatment system can efficiently reduce lean-NOx from the exhaust gas. During times that lean-NOx aftertreatment would be ineffective, the diesel engine is operated at or near a stoichiometric air-fuel ratio, so that a three-way catalyst (TWC) aftertreatment device can be used.

Figure 1:
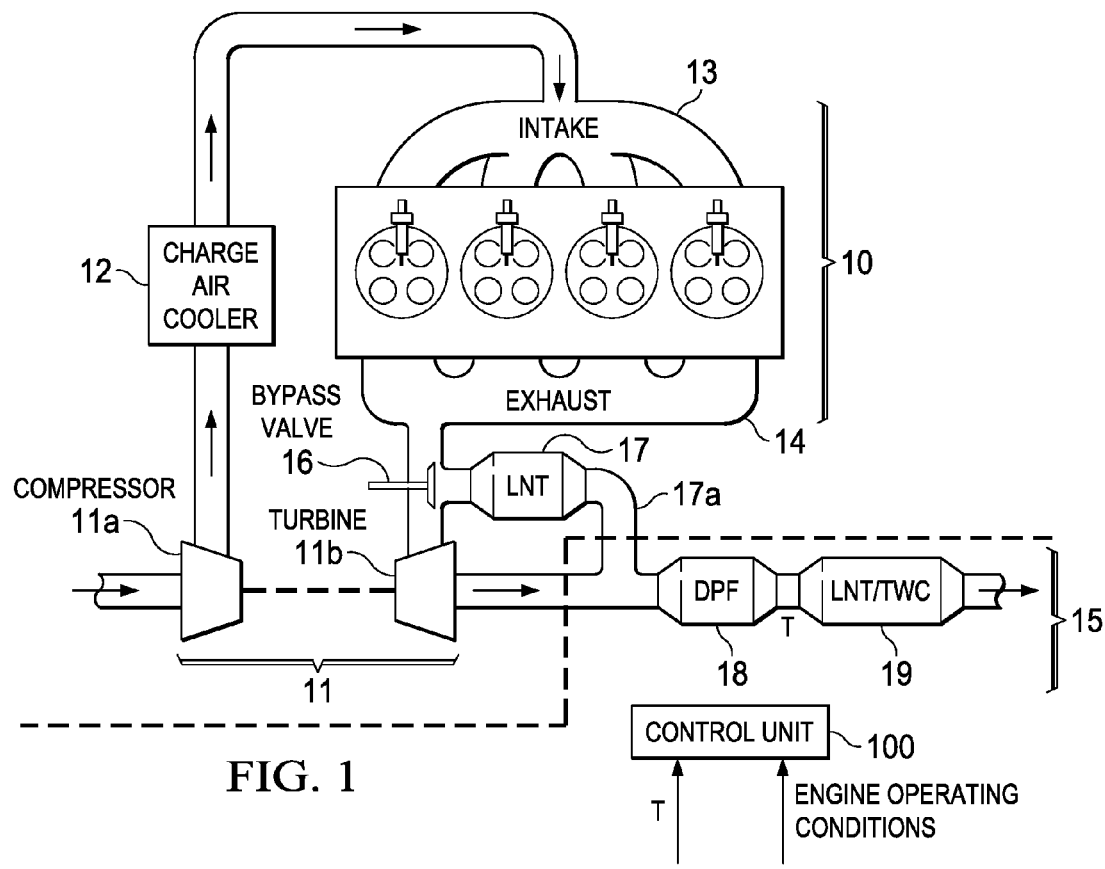
FIG. 1 illustrates a diesel-fueled engine having an exhaust aftertreatment system in accordance with the invention.

FIG. 1 illustrates a diesel engine 10 having an exhaust aftertreatment system. The direction of flow of intake air and exhaust gas is indicated by directional arrows. In the illustrative embodiment, engine 10 is an air-boosted engine having a turbocharger 11 (compressor 11*a* and turbine 11*b*).

The engine's intake air is compressed by the turbocharger's compressor 11*a*, which is mechanically driven by its turbine 11*b*. Desirably, the compressed air discharged from the compressor 11*a* is cooled through a cooler 12 positioned between the compressor 11*a* and the engine's intake manifold 13.

Exhaust gas discharged from the engine's exhaust manifold 14 is directed to the aftertreatment system, which comprises a bypass valve 16, an LNT 17, a DPF (diesel particulate filter) 18, and an LNT/TWC 19. The treated exhaust exits the aftertreatment system into the atmosphere via an exhaust tailpipe.

LNT 17 may be implemented with various known devices used to reduce oxides of nitrogen (NO and NO2) emissions from a lean burn internal combustion engine. A typical LNT is based on a catalytic converter support with a washcoat containing zeolites. Precious metals, such as platinum, may also be used.

Typically, the effective storage of an LNT changes with temperature. For example, an LNT might begin to store NOx between about 150 and 200 C. but at about 500 C. its absorption capability might be significantly diminished.

LNT 17 is close-coupled to the exhaust manifold 14. To be "close-coupled", LNT 17 is generally near the engine 10, and usually inside the engine compartment. This permits the LNT 17 to be more easily warmed by the heat of the exhaust manifold 14 and by the heat of the exhaust stream immediately exiting the exhaust manifold 14. In the embodiment of FIG. 1, the engine compartment is indicated by dashed lines, and LNT 17 is located in the engine compartment.

LNT 17 is used only when valve 16 is open. When valve 16 is closed, the entire exhaust flow is to the turbine 11*b*. Valve 16 may be a variable flow valve, i.e., it may be completely or only partially opened. Valve 16 may be implemented as a three-way valve to allow active control of exhaust gas between the turbine 11*b* and the bypass line 17*a*.

LNT 17 is also referred to herein as a "bypass LNT". It is positioned downstream of valve 16, on a bypass line 17*a* that joins the main exhaust line between the outlet of turbine 11*b* and the inlet of DPF 18.

LNT 17 is relatively small in size; its size may vary depending on the specific parameters chosen for the emissions control method described herein. As explained below, LNT 17 is used only for cold start and part-time operation, and can be smaller in capacity than the downstream LNT/TWC catalyst 19.

For example, if LNT 17 is only used when the engine is at a 10% power low-load operating condition, LNT 17 may only need to be about 10% of a full-load catalyst requirement. The LNT size may be reduced because there is no need to store NOx at high exhaust flow rates. It should be noted that the "capacity" of LNT 17 is a function of both its physical size and how much catalytic material is placed on the catalyst substrate. Less catalyst material on a larger substrate may act similarly to more catalytic material on a smaller substrate. If the emissions control strategy calls for fast warm-up of the bypass LNT 17, it may be best practice to use a smaller bypass catalyst with low thermal mass so that its heat-up time is minimized.

In general, the smaller LNT 17, the quicker the switch to the downstream LNT/TWC 19 as the engine load increases. An expected range of capacities for LNT 17 is from one-tenth to one-half the size of LNT/TWC 19. More specifically, LNT 17 may be expected to have a NOx reduction capacity that is 10-50% compared to that of LNT/TWC 19 in the same lean AFR condition.

DPF 18 may be any one of various devices designed to remove particulate matter from the exhaust gas of a diesel engine. Most DPF's are further designed to regenerate by burning accumulated particulate matter, either passively through the use of a catalyst or by active means such as a burner that heats the DPF to soot combustion temperatures.

LNT/TWC 19 is downstream of DPF 18, and is downstream of LNT 17 when valve 16 is opened. It is thus also referred to herein as the "downstream catalyst". LNT/TWC 19 is further from the engine than LNT 17, and is typically "under-floor".

In the turbocharged engine example of this description, the bypass exhaust line begins upstream the turbine 11b of the turbocharger 11, and the main exhaust line begins downstream the turbine 11b. In general, however, both exhaust lines receive exhaust from the exhaust manifold 14, with the bypass valve 16 determining whether exhaust will first flow through the bypass line.

LNT/TWC 19 is a single device, but designed to operate as an LNT when the engine is operated with lean AFRs (air-fuel ratios), and as a TWC when the engine is operated in at or near stoichiometric AFRs. This requirement is met by the formulation of the catalytic material and its placement on the catalyst substrate.

For example, LNT/TWC 19 may have the same platinum group metal formulation as a conventional TWC with the addition of NOx storage components, such as zeolite or precious metals. This allows it to operate like a TWC or LNT when the exhaust characteristics are appropriate for a TWC or LNT, respectively. For example, if, as a result of lean engine operation, the O2 levels are too high for effective NOx reduction by the TWC formulation, the NOx absorption formulation will trap NOx. Conversely, if as result of stoichiometric engine operation, the exhaust temperature is too high for effective NOx adsorption by the LNT formulation, the TWC formulation will reduce NOx levels.

Control unit 100 may be processor-based, programmed to control various aspects of engine operation. In general, control unit 100 may be implemented with various controller devices known or to be developed. Further, control unit 100 may be part of a more comprehensive engine control unit that controls various other elements of the engine and/or aftertreatment system. Control unit 100 is programmed to receive input signals and provide control signals, in the manner described below.

Figure 2:
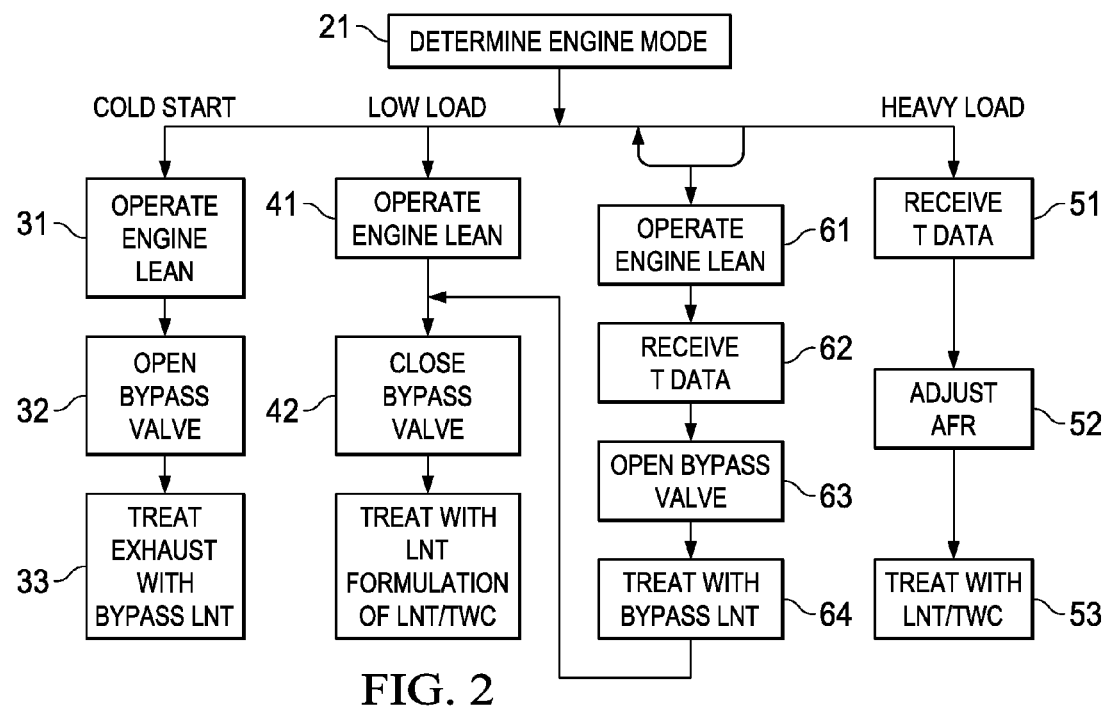
FIG. 2 illustrates a method of reducing emissions from a diesel engine using a system such as the system of FIG. 1.

FIG. 2 illustrates a method of operating a diesel engine and using its exhaust aftertreatment system to reduce emissions. Control unit 100 is programmed to receive input signals, perform various processing steps, and deliver output signals to perform this method.

Step 21 is determining which of the following three modes the engine is operating in: cold start, low load or high load. Various engine operating condition data may be used for this determination, as indicated by the input to control unit 100 in FIG. 1.

Steps 31-33 are performed if the engine is in cold start mode. In Step 31, the engine is controlled to operate with a lean AFR, and in Step 32, bypass valve 16 is opened. Typically, these steps are performed together or close in time, and as a result, in Step 33, the exhaust passes through and is treated by bypass LNT 17. As stated above, LNT 17 is close-coupled to the exhaust manifold 14 and is relatively small in size. When bypass valve 16 is open, exhaust gas quickly heats the bypass LNT 17, which traps NOx and oxidizes hydrocarbons and CO. The use of bypass LNT 17 achieves the cold-start goal of fast catalyst light-off and subsequent NOx reduction and/or hydrocarbon and CO oxidation.

Steps 41-43 are performed if the engine is in low load mode. In Step 41, the engine is controlled to operate with a lean AFR, and in Step 42, the bypass valve 16 is closed. At low load conditions (including idle), it is desirable to operate the engine at lean air-fuel ratio conditions, so that high engine efficiency is achieved. During this time, it is also necessary to have effective NOx reduction and HC/CO oxidation. Thus, after the cold start period, bypass valve 16 is closed or modulated, and in Step 43 exhaust is delivered to and treated by LNT/TWC 19. LNT/TWC 19 is formulated to operate as a LNT within a certain temperature range that allows NOx trapping and HC/CO oxidation. If bypass valve 16 is closed or modulated so that all or most exhaust is delivered to LNT/TWC 19, bypass LNT 17 becomes cooler.

Steps 51-53 are performed when the engine is in "high" load mode (which includes mid-load conditions). At mid-to-high load conditions, it is desirable to operate at lean air-to-fuel ratio conditions, unless the desired level of NOx reduction is unachievable. For example, exhaust temperature at a heavy load with a lean AFR may result in exhaust whose high temperature inhibits NOx absorption by the LNT formulation of LNT/TWC 19.

In Step 51, temperature data, representing the temperature of the exhaust at the LNT/TWC 19 is received and processed. Referring again to FIG. 1, a temperature sensor at the inlet to LNT/TWC 19 can provide temperature measurements to the control unit 100 for this purpose. In Step 52, it is determined whether the exhaust temperature is too hot for effective NOx reduction by the LNT formulation of LNT/TWC 19. If so, the air-fuel ratio transitions to stoichiometric to insure NOx reduction capability by the TWC formulation of LNT/TWC 19. To achieve a stoichiometric air-fuel ratio, various control mechanisms such as intake throttling, fuel injection pressure and timing adjustments, and boost air intake control may be used.

In Step 53, the exhaust is delivered to and treated by the LNT/TWC 19. As explained above, because of its formulation and design, regardless of the AFR, LNT/TWC 19 is formulated to effectively treat the exhaust. The stoichiometric operation continues until the load conditions are such that the exhaust temperature cools.

As further indicated in FIG. 2, Steps 61-64 may be performed during transitions from high load to low load. During these transitions, in Step 61, the engine is run lean. In Step 62, temperature data is received to determine whether LNT/TWC 19 is too hot for effective NOx trapping. If so, in Step 63, the bypass valve 16 is opened. In Step 64, the cooler bypass LNT 17 traps NOx and temporarily acts as the NOx reduction device. As the downstream LNT/TWC 19 cools to a predetermined temperature, it will become an effective NOx trap and NOx reduction can be achieved and bypass valve 16 is closed.

As indicated above, if valve 16 is implemented as a controllable three-way valve, when valve 16 is operated (Steps 42 and 63), desired proportions of exhaust gas may be directed to bypass line 17a and turbine 11b. The proportion of how much gas goes in which direction may be based on various factors, such as the temperature of LNT/TWC 19. It should also be understood, that the terms "open" and "closed" with respect to valve 16 could be equivalently reversed, depending on the valve configuration.

In sum, the above-described aftertreatment system and engine operating strategy is effective for conditions where high-load operation occurs at stoichiometric air-fuel ratios which will produce hot exhaust gas conditions. The exhaust is effectively treated by LNT/TWC 19 in this high-load condition.

Figure 3:
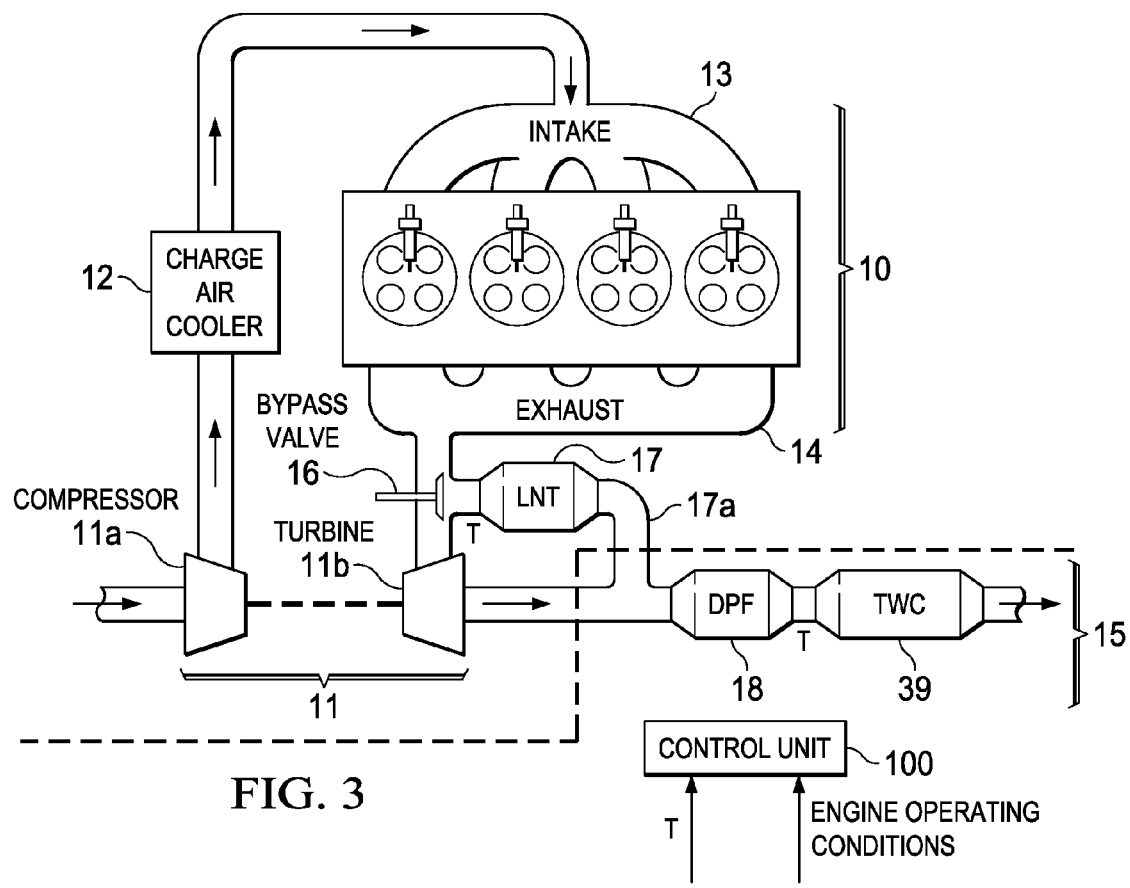
FIG. 3 illustrates an alternative embodiment of the aftertreatment system.
Figure 4:
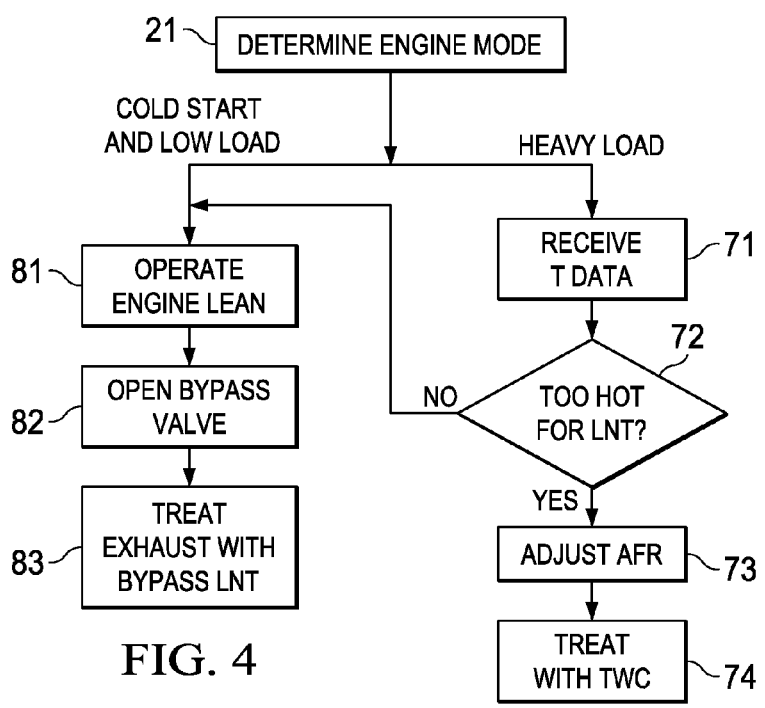
FIG. 4 illustrates a method of reducing emissions from a diesel engine using a system such as the system of FIG. 3.

FIGS. 3 and 4 illustrate an alternative embodiment in which, instead of a TWC/LNT on the main exhaust line, a TWC 39 (without NOx trapping catalyst formulation) is on the main exhaust line. Other elements of the system of FIG. 3 are like those described above.

As illustrated in FIG. 4, during lean engine operation, valve 16 operates so that all exhaust is directed to the bypass line 17a. Thus, in Steps 81-83, at cold start and low loads, when the engine is run lean, LNT 17 receives and treats all exhaust.

As indicated by Steps 72-74, at heavy loads, the exhaust temperature at the input to LNT 17 is monitored. If the temperature is not too hot for effective NOx treatment by LNT 17, the engine is run lean, valve 16 is open, and all exhaust is treated by LNT 17. If the temperature becomes too hot for effective NOx treatment by LNT 17, the engine is switched to stoichiometric operation, valve 16 is closed and all exhaust is treated by TWC 39.

What is claimed is:

1. A method of operating a diesel engine and treating the engine exhaust, comprising:
    providing a main exhaust line from an exhaust manifold of the engine, the main exhaust line having an LNT/TWC (lean NOx trap/three-way catalyst);
    wherein the LNT/TWC has a catalyst formulation such that it is operable to adsorb NOx when the engine is operating with a lean AFR (air-fuel ratio) and to reduce NOx when the engine is operating with a stoichiometric AFR;
    providing a bypass exhaust line having a valve and a bypass lean NOx trap (LNT);
    wherein the bypass exhaust line has a first end at or near the exhaust manifold and a second end that joins the main exhaust line upstream the LNT/TWC;
    wherein the valve, when open, allows entry of exhaust into the bypass exhaust line;
    wherein the bypass LNT is closely coupled with the exhaust manifold;
    during operation of the engine, determining which of the following modes the engine is currently in: cold start mode, light load mode, or heavy load mode;
    if the engine is in cold start mode, operating the engine with a lean AFR (air-fuel ratio) and the valve such that all or most exhaust flows through the bypass exhaust line;
    if the engine is in light load mode, operating the engine with a lean AFR and the valve such that all or most exhaust flows through the main exhaust line;
    if the engine is in heavy load mode, determining if a transition between a lean AFR and a stoichiometric AFR is desired and operating the valve such that all or most exhaust flows through the main exhaust line;
    during transition from heavy load mode to light load mode, operating the engine with a lean air-fuel ratio and opening the bypass valve such that exhaust flows through the bypass exhaust line until the LNT/TWC cools to a pre-determined temperature.

2. The method of claim 1, wherein the main exhaust line has a DPF (diesel particulate filter) upstream the LNT/TWC.

3. The method of claim 1, wherein the engine has a turbocharger, the bypass line begins upstream a turbine of the turbocharger, and the main exhaust line begins downstream the turbine.

4. The method of claim 1, wherein the engine is enclosed in an engine compartment and the bypass LNT is located in the engine compartment.

5. The method of claim 1, wherein the step of determining whether a transition between a lean AFR and a stoichiometric AFR is necessary is determined by the temperature of the exhaust at the inlet of the LNT/TWC.

6. A method of operating a diesel engine and treating the engine exhaust, comprising:
    providing a main exhaust line from an exhaust manifold of the engine, the main exhaust line having an LNT/TWC (lean NOx trap/three-way catalyst);
    wherein the LNT/TWC has a catalyst formulation such that it is operable to adsorb NOx when the engine is operating with a lean AFR (air-fuel ratio) and to reduce NOx when the engine is operating with a stoichiometric AFR;
    providing a bypass exhaust line having a valve and a bypass lean NOx trap (LNT);
    wherein the bypass exhaust line has a first end at or near the exhaust manifold and a second end that joins the main exhaust line upstream the LNT/TWC;
    wherein the valve, when open, allows entry of exhaust into the bypass exhaust line;
    wherein the bypass LNT is closely coupled with the exhaust manifold;
    during operation of the engine, determining which of the following modes the engine is currently in: cold start mode, light load mode, or heavy load mode;
    if the engine is in cold start mode, operating the engine with a lean AFR (air-fuel ratio) and the valve such that all or most exhaust flows through the bypass exhaust line;
    if the engine is in light load mode, operating the engine with a lean AFR and the valve such that all or most exhaust flows through the main exhaust line;
    if the engine is in heavy load mode, determining if a transition between a lean AFR and a stoichiometric AFR is desired and operating the valve such that all or most exhaust flows through the main exhaust line;
    wherein the bypass LNT has a NOx reduction capacity of fifty percent or less compared to the NOx reduction capacity of the LNT/TWC in the same lean AFR condition.

7. The method of claim 6, wherein the main exhaust line has a DPF (diesel particulate filter) upstream the LNT/TWC.

8. The method of claim 6, wherein the engine has a turbocharger, the bypass line begins upstream a turbine of the turbocharger, and the main exhaust line begins downstream the turbine.

9. The method of claim 6, wherein the engine is enclosed in an engine compartment and the bypass LNT is located in the engine compartment.

10. The method of claim 6, wherein the step of determining whether a transition between a lean AFR and a stoichiometric AFR is necessary is determined by the temperature of the exhaust at the inlet of the LNT/TWC.

\* \* \* \* \*